J. G. BICKEL.

Faucet.

No. 6,394. Reissued April 20, 1875.

Witnesses:

John R. Edmonds

Thomas Edmonds

Inventor:

John G. Bickel by Michael J. Stark

Attorney.

THE GRAPHIC CO. PHOTO-LITH. 39 & 41 PARK PLACE, N.Y.

UNITED STATES PATENT OFFICE.

JOHN G. BICKEL, OF BUFFALO, NEW YORK, ASSIGNOR, BY MESNE ASSIGNMENTS, TO JOHN IRLBACKER AND JACOB DAVIS, OF SAME PLACE.

IMPROVEMENT IN FAUCETS.

Specification forming part of Letters Patent No. 42,828, dated May 24, 1864; reissue No. 6,394, dated April 20, 1875; application filed January 14, 1875.

*To all whom it may concern:*

Be it known that I, JOHN G. BICKEL, of Buffalo, in the county of Erie and State of New York, have invented a Beer-Faucet, of which the following is a specification:

The nature of my invention will be pointed out in the claims, and described and illustrated in this specification and the accompanying drawings, in which—

Figure 2:
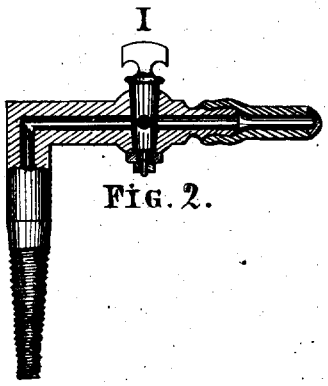
Figure 1:
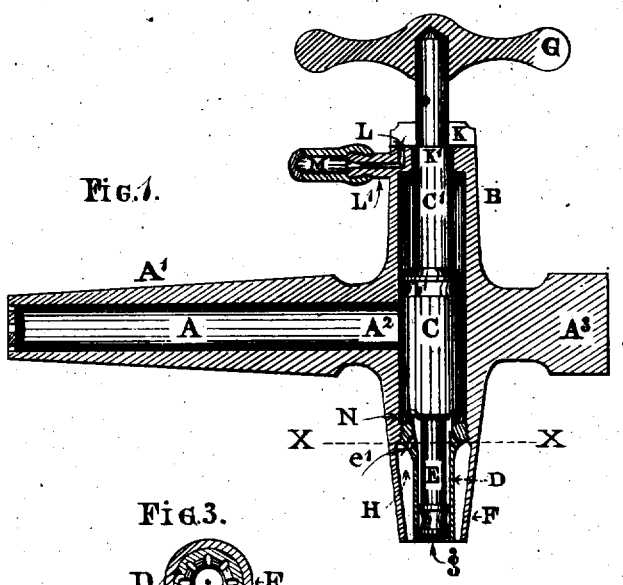
Figure 3:
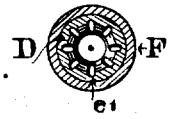

Figure 1 is a longitudinal section of my improved faucet; Fig 2, a longitudinal section of the stop-cock, placed in the head of the cask and connected to the faucet by a flexible tube. Fig. 3 is a transverse section of line X X′ of Fig. 1.

Like letters of reference indicate like parts in the several figures.

A is the body proper of my improved beer-faucet. It consists of the conical shank $A^1$, fitting the draft-opening of a cask, the barrel or chamber B, and the head $A^3$. $A^1$ is the shank of the faucet, and contains the main passage $A^2$. B is the barrel or chamber of the faucet. It is provided on its lower end, and within the said chamber B, with a squirting-cylinder, D, attached to or forming one part with B, and on its upper end with a vent-opening, L, terminating in a nozzle, L′, attached to the side of the chamber B. C is a plug for the chamber B. It consists of the central part C, the upper stem C′, and the lower stem E, said lower stem E being the piston for the squirting-cylinder D. C is provided near its upper edge with a groove, *b′*, filled with an elastic packing, and on its lower side with a bearing or valve, resting upon a washer, N; the purpose of the packing *b′* and washer N being to close the main opening or passage $A^2$, when the plug C is depressed and in the position shown in Fig. 1. C′ is the upper stem. It forms one part with the central plug C, and is provided with a shoulder, K′, and terminates within the handle G. D is the squirting-cylinder located within the chamber B and below the main passage $A^2$. It is attached to or forming one part with the extension F of the chamber B, and provided on its lower side or bottom with a minute opening, *g*. D is also provided with a passage or number of passages, *e*, arranged around the squirting-cylinder D, serving as a discharge for the liquid from the chamber B into the discharge-nozzle H of the chamber B. F is an extension of the chamber B. It contains the squirting-cylinder D, and also the discharge-nozzle H. K is a flat-faced valve sliding upon the upper stem C′ and resting upon the face of the chamber B, where it covers the vent-opening L. L′ is a nozzle attached to the upper end of chamber B. M is a flexible tube attached with one end to the nozzle L′, and on the other end to a stop-cock, I, placed into the head of the cask from which liquid is to be drawn.

To operate my faucet, lift the handle, G, attached to the upper stem C′, sufficiently high to allow the central part C to uncover the main passage $A^2$, when the liquid will flow from the cask, through the main passage $A^2$ and chamber B, into the squirting-cylinder D, and, after having filled the same through *e′* and discharge-nozzle H into the vessel to be filled, to stop the flow of liquid the handle G is depressed, when the plug C will close the main passage $A^2$, and at the same time force out the contents of the squirting-cylinder D through the minute opening *g* by means of the piston E, attached to and operated by the plug C, thus causing a lively and sparkling foaming of the liquid in the vessel just filled.

It will be observed that the closing of the main passage $A^2$ is accomplished by the cylindrical plug C passing the said passage.

The venting device for the cask operates automatically in the following manner. When the handle G is raised, the shoulder K′ will lift the valve K from the face of the chamber B, and thus uncover the vent-opening L, being in communication with the stop-cock I, placed in the head of the cask by means of the flexible tube M. The air will flow through the vent-opening L, flexible tube M, and stop-cock I into the cask, thus allowing the liquid to flow off. As soon as the handle G is depressed, and the central part C upon its seat, the valve K will be upon its seat also, and thus, covering the vent-opening L, will break the communication of the atmosphere with the space of the cask above the liquid contained therein, and thus prevent the exit of the gases through the vent-opening L.

By constructing beer-faucets as described I derive advantages that cannot be obtained by any other mode of construction with which I am acquainted, and which may be stated to be as follows: First, the chamber of my faucet, being made in one piece with the central body, is more substantial than those in which the same is formed in a separate piece screwed into the body, and less liable to derangement; second, the plug and piston being also formed of one solid piece of metal, are for the same reason superior to those otherwise constructed; third, the plug and piston are capable of a combined rotary and reciprocating movement by means of the cross-handle attached to the upper stem thereof, which is a decided feature of my invention, and has not been done heretofore; fourth, the general construction and arrangement is simpler and more effective.

Having thus fully described my invention, I desire to secure by Letters Patent the claims—

1. In a beer-faucet, the combination with a chamber, of a plug, serving to control the flow of liquor, and a piston serving as a plunger, when both are formed of one continuous piece of metal, and capable of a combined rotary and reciprocating movement, substantially as described, and for the use and purpose set forth.

2. The combination, with the chamber B, constructed in one piece with the body A, of the plug C, upper stem C′, cross-handle G, lower stem E, and a squirting-cylinder, D, when the said plug C, upper stem C′, and lower stem E are formed of one piece of metal, and capable of a combined rotary and reciprocating movement, substantially and described, and for the use and purpose set forth.

3. The combination, with the body A, of the chamber B, when the said chamber is formed in one piece with the body A, substantially as described.

JOHN G. BICKEL.

Witnesses:
J. L. HUBER,
CARL FIESEL.